United States Patent [19]
Kolecki

[11] Patent Number: 4,546,938
[45] Date of Patent: Oct. 15, 1985

[54] POWER UNIT FOR HANG-GLIDERS

[76] Inventor: Jerzy W. Kolecki, Grusåsgränd 82, S-122 22 Enskede 1, Sweden

[21] Appl. No.: 421,192

[22] Filed: Sep. 22, 1982

[51] Int. Cl.⁴ .................. B64D 35/00; B64D 27/00
[52] U.S. Cl. ........................... 244/66; 244/51; 244/60; 244/54; 244/DIG. 1
[58] Field of Search ............ 244/DIG. 1, 54, 55, 244/56, 60, 66, 51; 440/57, 83; 464/178, 147, 88; 285/184, 185; 403/84, 85, 100, 103; 248/554

[56] References Cited

U.S. PATENT DOCUMENTS

| | | | |
|---|---|---|---|
| 815,581 | 3/1906 | Dean | 285/184 |
| 918,410 | 4/1909 | Wright | 244/51 |
| 1,987,606 | 1/1935 | Davis | 244/66 |
| 2,451,438 | 10/1948 | Hartman | 464/88 |
| 2,570,581 | 10/1951 | McIntyre | 403/103 |
| 2,896,431 | 7/1959 | Stillwagon, Jr. | 464/88 |

OTHER PUBLICATIONS

"Power Up Company", advertisement from *Hang Gliding*, May, 1979.

*Primary Examiner*—Trygve M. Blix
*Assistant Examiner*—Rodney Corl
*Attorney, Agent, or Firm*—Sughrue, Mion, Zinn, Macpeak & Seas

[57] ABSTRACT

A power unit for a hang-glider (1) or the like comprises a combustion motor (2) connected to one end of a drive shaft (9) and a propeller (10) connected to the other end of the drive shaft. To enable the power unit to be used both with pulling or traction-force propellers and pushing propellers (10) there is provided between the drive shaft (9) and the shaft (22) of the propeller (10) a flexible coupling (14) which enables the angle between the drive shaft and the propeller shaft to be adjusted at least in a vertical direction.

4 Claims, 5 Drawing Figures

POWER UNIT FOR HANG-GLIDERS

The invention relates to a power unit intended for hang-gliders or other similar ultra-light airbourne craft and comprising a combustion engine in driving connection with one end of a drive shaft, and a propeller connected to the other end of said drive shaft.

A certain demand is found for hang-glider power units of this kind. The power unit has the form of a pack which is firmly strapped to the back of the pilot.

A prime object of the invention is to provide a power unit which can be attached directly to the hang-glider or other airbourne craft; which can be used with both pulling and pushing propellers and which enables the propeller shaft to be so aligned that the propeller can be placed in the best possible position relative to the pilot.

This object is realized by the invention defined in the claims and described hereinafter with reference to an embodiment thereof illustrated in the accompanying drawings, in which FIG. 1 is a simplified view of an embodiment of a power unit attached to a hang-glider, the power unit being provided with a pulling propeller;

Figure 1:
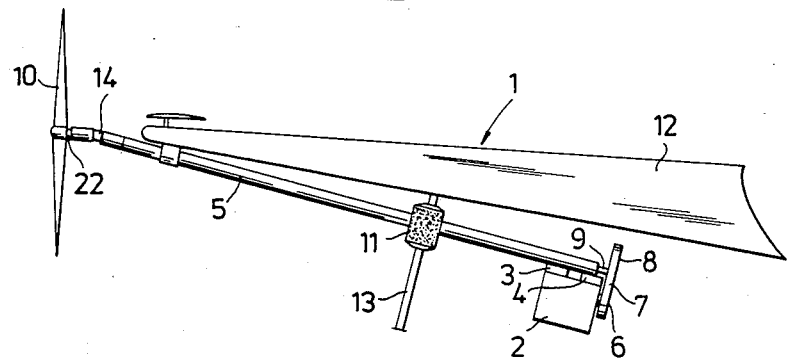

FIG. 1 illustrates in a very simple manner a hang-glider 1 provided with a power unit according to the invention, said power unit being mounted for a pulling propeller or traction-type airscrew. The power unit comprises a combustion motor 2 which is connected by means of rubber shock absorbers or the like 3 and 4, to a tube 5 which extends in the longitudinal direction of the hang-glider 1 substantially along the whole length of said hang-glider. The motor 2 has attached to the motor shaft a belt pulley 6 over which a belt 7 drives a further belt pulley 8 attached to a drive shaft 9, which is journalled in the tube 5 and the other end of which is connected to a pulling propeller or traction-type airscrew 10. The whole of the power plant is suspended at its centre of gravity by means of a vibration damping device 11 arranged in the frame structure (not shown in detail) supporting the sail 12 of the hang-glider 1. The vibration damping device 11 is of a well known kind and is arranged to prevent vibrations set up in the power plant from being transmitted to the frame structure of the hang-glider and to a A-frame 13. Similar vibration damping devices are arranged between the motor and the tube 5 and between the tube 5 in the vicinity of the flexible coupling, described hereinafter, and the frame structure not shown. More conveniently, the vibration damping device is mounted on the A-frame connected to said frame structure and referenced 13 in the figure. Arranged between the drive shaft 9 and the propeller 10 is an adjustable coupling 14, which enables the force vector for the propeller 10 to be placed substantially parallel with the air flow in the direction in which the hang-glider 1 moves.

Figure 2:
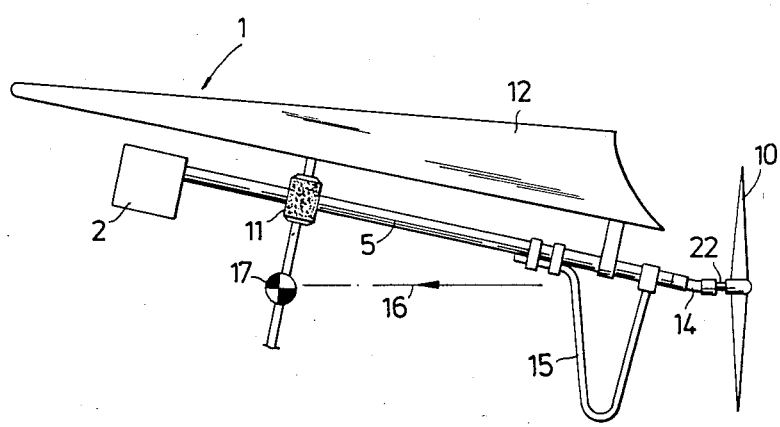
FIG. 2 illustrates an embodiment of a power unit provided with a pushing propeller.

FIG. 2 illustrates in a simplified manner a hang-glider provided with a pushing propeller and with a power plant according to the invention. The power plant illustrated in FIG. 2 is different to the power plant illustrated in FIG. 1, in that the shaft of the motor 2 is connected directly to the drive shaft. To protect the propeller on landing or on take off, a guard 15 is arranged in front of the propeller 10, said guard being fixedly attached to the tube 5. It will be understood that a guard 15 can also be provided in the embodiment illustrated in FIG. 1.

In order to obtain a suitable direction with respect to the force vector of the pushing propeller 10 relative to the hang-glider 1, the coupling 14 of the FIG. 2 embodiment has been set to an upper position so that the force vector, referenced 16, passes substantially through the centre of gravity 17 of the system as a whole.

Figure 3:
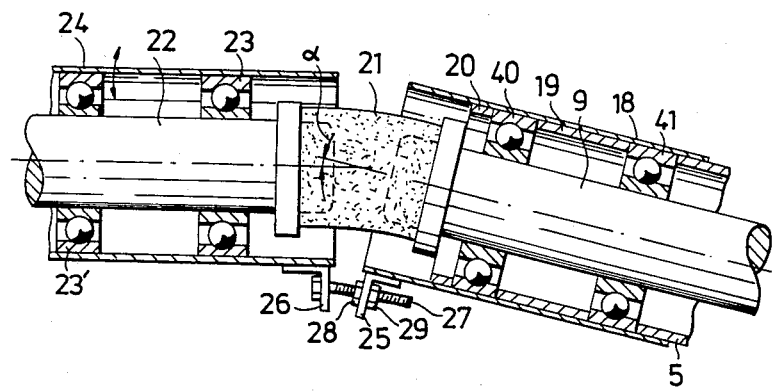
FIG. 3 is a vertical sectional view through an angularly adjustable coupling between drive shaft and propeller of the embodiments illustrated in FIGS. 1 and 2.

FIG. 3 is a vertical sectional view through the coupling 14 and adjacent parts. As will be seen from the Figure the drive shaft 9 is journalled in the tube 5 by means of ball bearings 40 and 41. The ball bearing 41 is held against the end part of the tube 5 by means of an outer sleeve 18, in which the ball bearing 40 is also mounted. Arranged between the bearings 40 and 41 is a cylindrical bush 19, while outside the bearing 40 there is provided a stop ring 20 which is fixedly attached to the sleeve 18 by means not shown. The end of the drive shaft 9 is fixedly connected to a cylindrical, axially flexible rubber body 21. The other end of the rubber body 21 is fixedly connected to a stub axle 22 which is journalled in ball bearings 23,23', which in turn are fixedly mounted in a sleeve 24. The stub axle 22 is fixedly connected to the propeller 10. The stub axle 22 can be positioned obliquely relative drive shaft 9, so as to obtain the desired direction of the pulling forces or propulsion forces in accordance with FIGS. 1 and 2. The rubber body 21 can be replaced with any suitable flexible body whatsoever, for example a helical spring, a flexible plastics body or the like.

Figure 4:
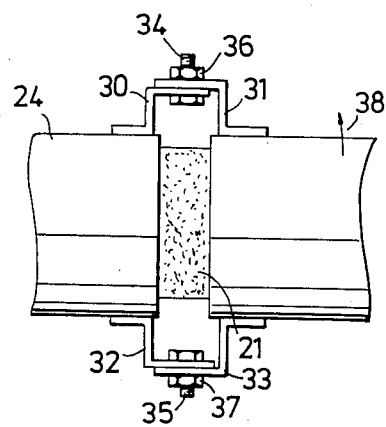
FIG. 4 is a top plan view of the arrangement illustrated in FIG. 3.
Figure 5:
FIG. 5 illustrates an element of a pivot means for enabling adjustment of the angle between drive shaft and propeller shaft.

This setting of the stub axle 22, which may mean a change in the angle $\alpha$ between for example 0° and 20° in both directions in a vertical plane, can be achieved by means of any suitable setting means whatsoever. Examples of such setting means are illustrated in FIGS. 3 and 4. Fixedly connected to the tube 5 and the sleeve 24 are angles 25 and 26 which are provided with holes for receiving a bolt 27 arranged to co-act with lock nuts 28 and 29. The same setting mechanism can be used on the diametrically opposite side of the body 21 to reach maximum stability. Thus, the angle $\alpha$ can be set to a suitable value in a vertical plane through the longitudinal axis of the hang-glider 1. To ensure that this angle setting only takes place in the vertical plane, there is provided on both sides two hinge means, which comprise two Z-shaped hinge pieces 30,31 and 32,33 respectively provided with holes for co-acting with bolts 34 and 35. The shafts of bolts 34 and 35 are coaxial with one another and the bolts are provided with lock nuts 36 and 37. Subsequent to setting the angle $\alpha$, the hinge means are locked by means of nuts 36 and 37. It may be necessary sometimes to also slightly adjust the angle between the drive shaft 9 and the propeller shaft 22 in the horizontal plane, for example an adjustment of $\pm 1°$, as indicated by the arrow 38 in FIG. 4. Provision for such an adjustment of the angle in the horizontal plane can be made by elongating the holes 39 receiving the bolts 34,35 as illustrated in FIG. 5 which shows the part 31 from above.

As will be understood the aforedescribed specific elements can be modified without departing from the scope of the invention.

What is claimed is:

1. A power unit for a hang-glider or the like ultra-light air craft; said power unit comprising:

a combustion motor, a drive shaft, means connecting said combustion motor to one end of said drive shaft, a propeller shaft connected to the other end of the drive shaft and driven thereby, the improvement comprising a supporting tube mounting said combustion engine externally thereof, means for journalling said drive shaft internally of said supporting tube, means for connecting said supporting tube to said hang-glider at the location of the center of gravity common to the hang-glider and to said power unit with said supporting tube extending in the direction of the movement of said hang-glider, a sleeve concentrically surrounding said propeller shaft and means for journalling said propeller shaft within said sleeve, a flexible coupling comprising a rubber body having a first end fixed to the other end of said drive shaft, and a second end fixed to one end of said propeller shaft, a propeller fixedly mounted to the other end of said propeller shaft, opposed hinge means connecting said supporting tube to said sleeve at opposite sides thereof, and locking means at right angles to said opposed hinge means connecting said supporting tube to said sleeve to lock said hinge means in a set angular position such that the force vector generated by rotation of the propeller is in the desired direction relative to the hang-glider.

2. The power unit as claimed in claim 1, wherein said hinge means comprises z-shaped hinge members fixed to the sides of said supporting tube and said sleeve at respective ends of said supporting tube and sleeve and extending longitudinally beyond the ends of said supporting tube and sleeve and bolt and nut means projecting through overlapped ends of said z-shaped hinge pieces defining a hinge pivot access between said hinge pieces to opposite sides of said supporting tube and sleeve, and wherein, said locking means comprises angles fixedly mounted to the confronting ends of said supporting tube and sleeve at the bottom thereof, and a bolt passing through aligned holes within said angle and bearing paired lock nuts on opposite sides of one of said angles to lock said ends of said supporting tube and said sleeve at a given distance from each other at the bottom, thereby locking the sleeve and supporting tube at axially inclined position with said rubber body flexing to meet the angular inclination of said supporting tube relative to said sleeve.

3. The power unit as claimed in claim 2, wherein said supporting tube comprises an inner tube which terminates short of the end of the drive shaft, an outer tube fixedly mounted to said inner tube at the end adjacent the sleeve bearing said propeller shaft, a first ball bearing mounted within said outer tube and abutting the end of said inner tube, a cylindrical bush coaxially mounted within said outer tube in abutment with said first ball bearing, a second ball bearing concentric with said outer tube, positioned therein and abutting the end of said cylindrical bush opposite said first ball bearing, said drive shaft projecting through said first and second ball bearings, and a stop ring fixed to the interior of said outer tube, and abutting the end of said second ball bearing remote from said cylindrical bush for maintaining said ball bearings and said bush in position within said outer tube.

4. The power unit as claimed in claim 2, wherein one of said z-shaped hinge pieces to one side of said supporting tube includes an elongated slot through which said bolt and nut means project, said slot extending longitudinally parallel to the axis of said drive shaft to permit a slight adjustment in the angle between the drive shaft and the propeller shaft in the horizontal plane.

* * * * *